US008905482B2

(12) United States Patent
Rao et al.

(10) Patent No.: US 8,905,482 B2
(45) Date of Patent: Dec. 9, 2014

(54) HIDDEN REAR SEAT HEAD RESTRAINTS FOR IMPROVED VISIBILITY

(71) Applicant: Ford Global Technologies, LLC, Dearborn, MI (US)

(72) Inventors: Manoharprasad K. Rao, Novi, MI (US); Mangala M. Jayasuriya, Bloomfield Hills, MI (US); Jialiang Le, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 83 days.

(21) Appl. No.: 13/665,086

(22) Filed: Oct. 31, 2012

(65) Prior Publication Data

US 2014/0117735 A1 May 1, 2014

(51) Int. Cl.
*B60R 21/055* (2006.01)

(52) U.S. Cl.
USPC .......................................................... 297/403

(58) Field of Classification Search
CPC ..... B60N 2/4855; B60N 2/4805; B60N 2/487
USPC .......................................................... 297/403
See application file for complete search history.

(56) References Cited

U.S. PATENT DOCUMENTS

| 4,623,166 | A | * | 11/1986 | Andres et al. ............. 297/403 X |
| 4,711,494 | A | * | 12/1987 | Duvenkamp ................ 297/403 |
| 4,834,456 | A | * | 5/1989 | Barros et al. .................. 297/403 |
| 4,935,680 | A | * | 6/1990 | Sugiyama ................. 297/403 X |
| 4,977,973 | A | | 12/1990 | Takizawa |
| 5,003,240 | A | * | 3/1991 | Ikeda ......................... 297/403 X |
| 5,006,771 | A | * | 4/1991 | Ogasawara .............. 297/403 X |
| 5,095,257 | A | | 3/1992 | Ikeda et al. |
| 5,105,132 | A | * | 4/1992 | Sakamoto et al. ............ 318/434 |
| 6,074,011 | A | * | 6/2000 | Ptak et al. ...................... 297/408 |
| 7,145,263 | B2 | | 12/2006 | Nathan et al. |
| 7,431,399 | B2 | * | 10/2008 | Kern et al. .................... 297/403 |
| 8,672,409 | B2 | * | 3/2014 | Yetukuri et al. .............. 297/403 |

FOREIGN PATENT DOCUMENTS

JP 1172039 A 7/1989
WO 2009073971 A1 6/2009

* cited by examiner

*Primary Examiner* — Rodney B White
(74) *Attorney, Agent, or Firm* — Shook Hardy & Bacon, LLP

(57) ABSTRACT

A seat assembly including a head restraint for a vehicle seat that can be raised and lowered depending on the presence or absence of a seat occupant is disclosed. The seat assembly includes a seat having a seat base and seat back and a head restraint selectively movable between a stowed position and an upright position. The seat assembly further includes a head restraint motion assembly connecting the seat back and the head restraint and a sensor operatively associated with either or both of the seat base and the seat back for sensing an occupant. The head restraint includes at least one head restraint post connecting the head restraint to the head restraint motion assembly. The head restraint motion assembly includes a drive motor attached to a motor shaft attached to the head restraint post(s). A locking arrangement is provided to maintain the head restraint in its upright position.

15 Claims, 8 Drawing Sheets

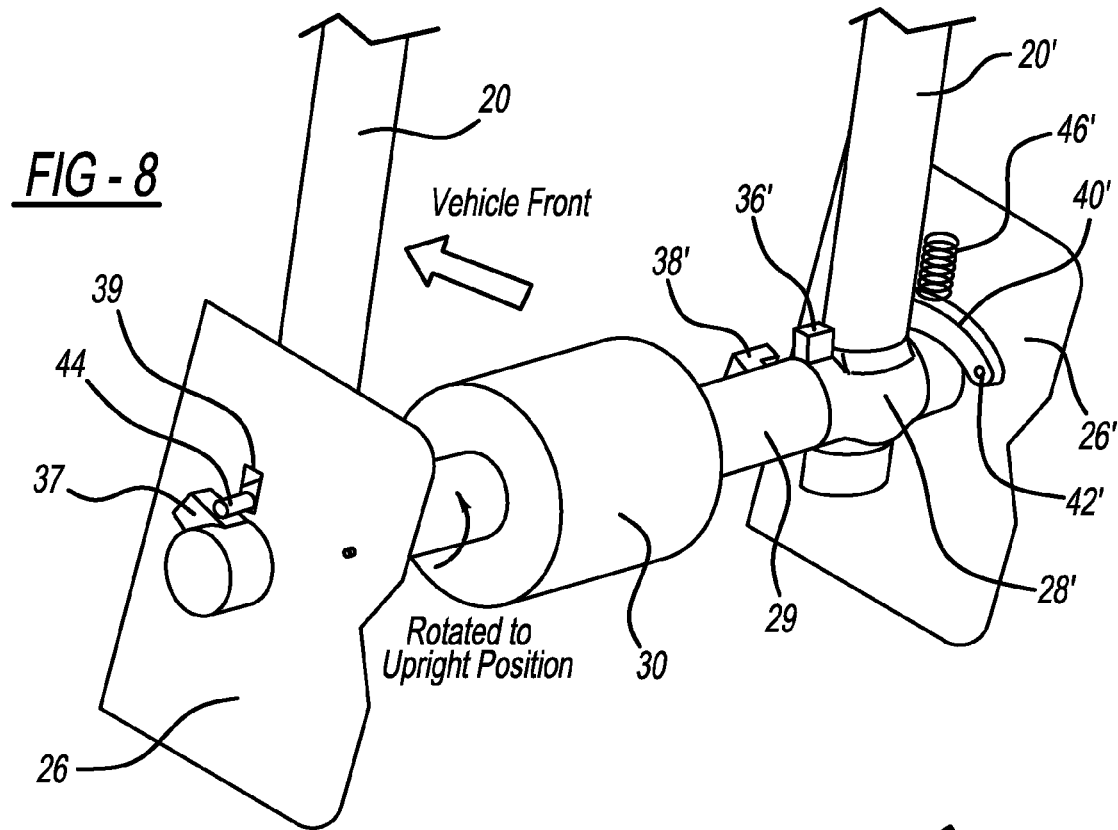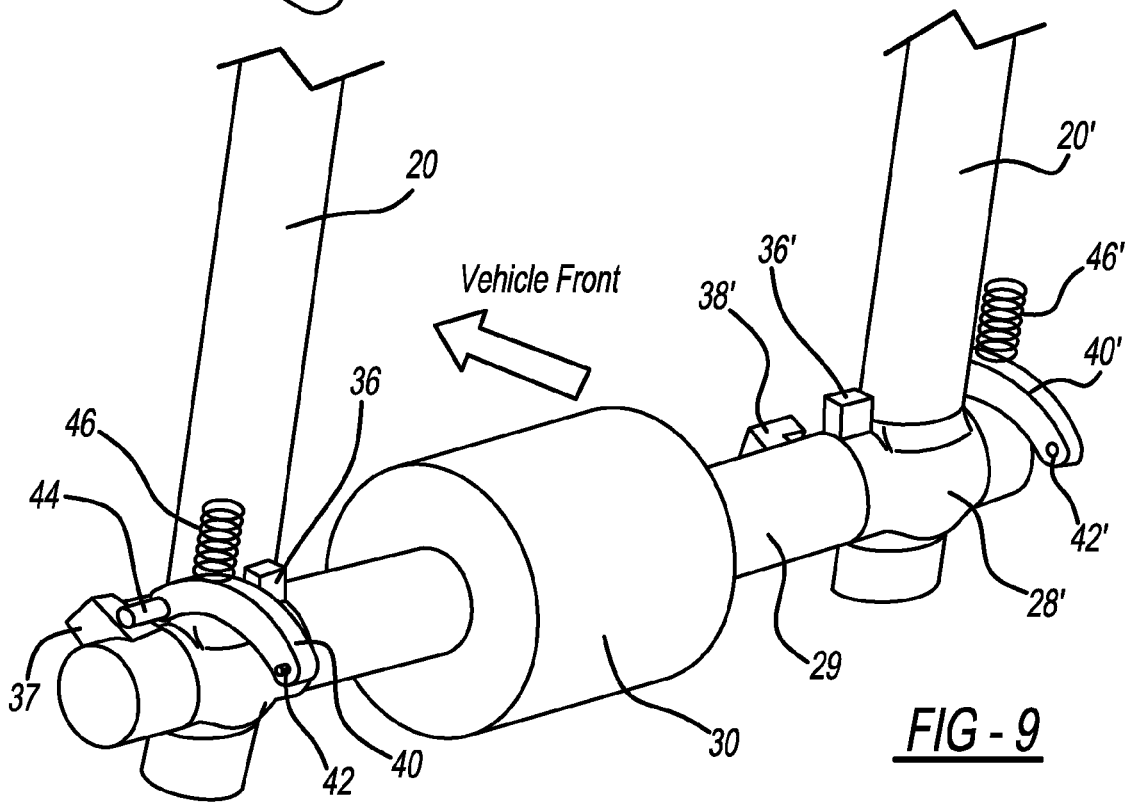

HIDDEN REAR SEAT HEAD RESTRAINTS FOR IMPROVED VISIBILITY

TECHNICAL FIELD

The disclosed invention relates generally to automotive head restraints. More particularly, the disclosed invention relates to automotive head restraints, particularly to rear seat head restraints, that are movable between an upright position when the presence of an occupant is sensed and a lowered or hidden position when no occupant presence is sensed.

BACKGROUND OF THE INVENTION

Seat head restraints have been used for many years in automotive vehicles. These head restraints generally extend vertically from the seat back. They are provided for neck and head protection during rear impacts and thus may prevent neck hyperextension.

At first head restraints were only required for the front seats of vehicles. However, as seat technology advanced and additional concerns arose over the need for head restraints for all passengers of the vehicle, today rear seat head restraints have become mandatory. As is frequently the case with new mandated technology, the rear head restraints on newer vehicles appear to be after-thoughts and frequently do not appear to have been a planned part of the seat design.

Current rear seat head restraints add additional height to the rear seats even when the head restraint is adjusted to the lowest height position. While providing a valuable addition to vehicle seating, this additional height partially blocks the view from the rearview mirror, especially for $5^{th}\%$ female drivers. This situation exists even when there are no passengers on the rear seats. Upright head restraints on foldable rear seats may also interfere with the proper movement of the seat back from its upright position to its lowered position.

Accordingly, what is desired is a system that provides for movement of a head restraint between its upright position when a passenger is present and its lowered position when no passenger is present. A further improvement would be such a system in which movement of the head restraint between its upright position and its lowered position is undertaken automatically based on the presence or absence of a seat occupant.

As in so many areas of vehicle technology, particularly with respect to vehicle safety systems, there is always room for improvement.

SUMMARY OF THE INVENTION

The disclosed invention overcomes several of the problems of the prior art by providing a head restraint for any seat in the vehicle but primarily for rear seats that can be selectively moved between an upright and operating position and a lowered and substantially hidden position. Movement of the head restraint provides for improved driver rear visibility through the rearview mirror when there are no rear seat passengers. If a passenger is detected, the corresponding head restraint will be raised to a proper position for comfort and safety.

The seat assembly of the disclosed invention includes a seat having a seat base and seat back and a head restraint selectively and rotatably movable between a stowed and substantially hidden position and an upright position. The seat assembly further includes a head restraint motion assembly connecting the seat back and the head restraint and a sensor operatively associated with either or both of the seat base and the seat back for sensing if an occupant is present. Any suitable occupant presence detection sensors, such as an electro-resistive sensor, a weight sensor, and so forth can be used for occupant presence detection.

The head restraint includes at least one head restraint post connecting the head restraint to the head restraint motion assembly. The head restraint motion assembly itself includes a drive motor attached to a motor shaft that is attached to the head restraint post(s).

The duration of motor rotation can be controlled by on-off contact switches or by some other means to achieve the stowed or upright positions of the head restraint. The head restraint motion assembly includes a locking arrangement for locking the head restraint in its upright position. To stow the head restraint, the motor first disengages the locking arrangement and then continues the rotation to bring the head restraint to its stowed position.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein:

FIG. 8 illustrates a detailed view of the post, motor, motor shaft and seat beam brackets of the head restraint motion assembly;

FIG. 9 is the same as FIG. 8 but does not include the seat beam brackets;

DETAILED DESCRIPTION OF THE PREFERRED EMBODIMENT

Figure 1:
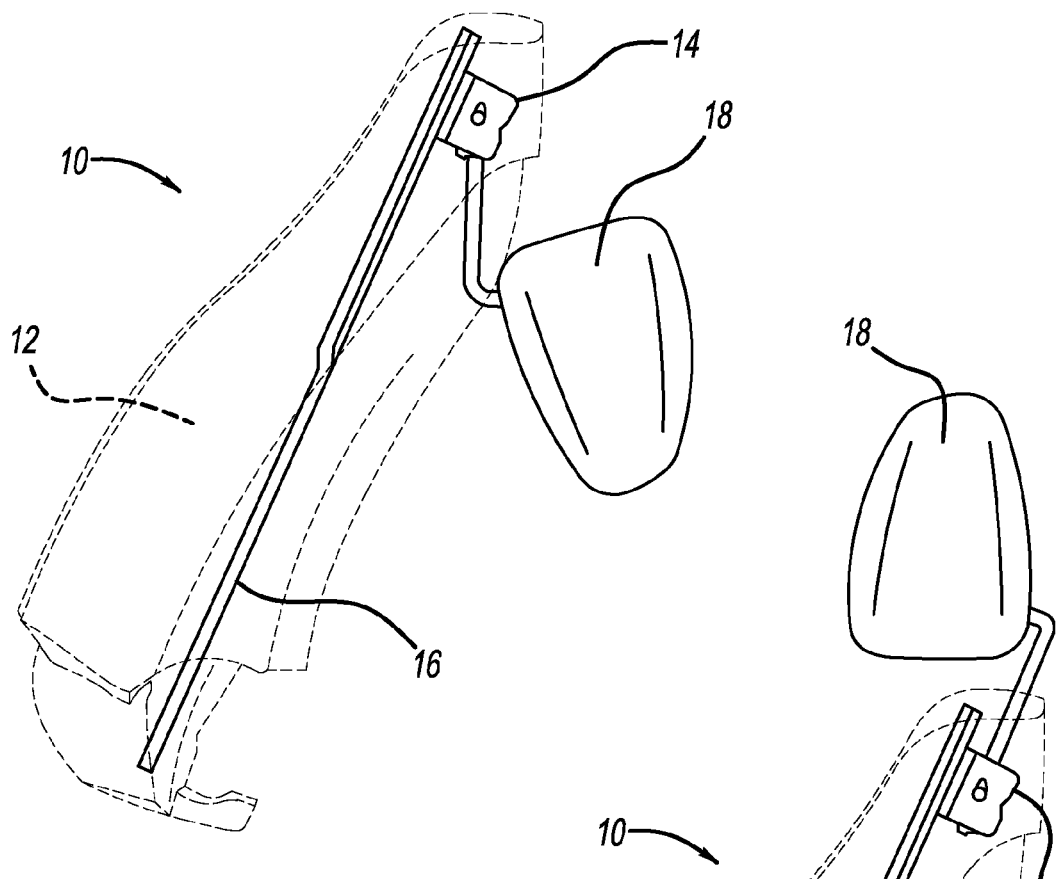
FIG. 1 illustrates the disclosed invention in which a seat frame and its associated stowed head restraint are shown in relation to the remainder of the seat back shown in broken lines.

In the following figures, the same reference numerals will be used to refer to the same components. In the following description, various operating parameters and components are described for different constructed embodiments. These specific parameters and components are included as examples and are not meant to be limiting.

Figure 2:
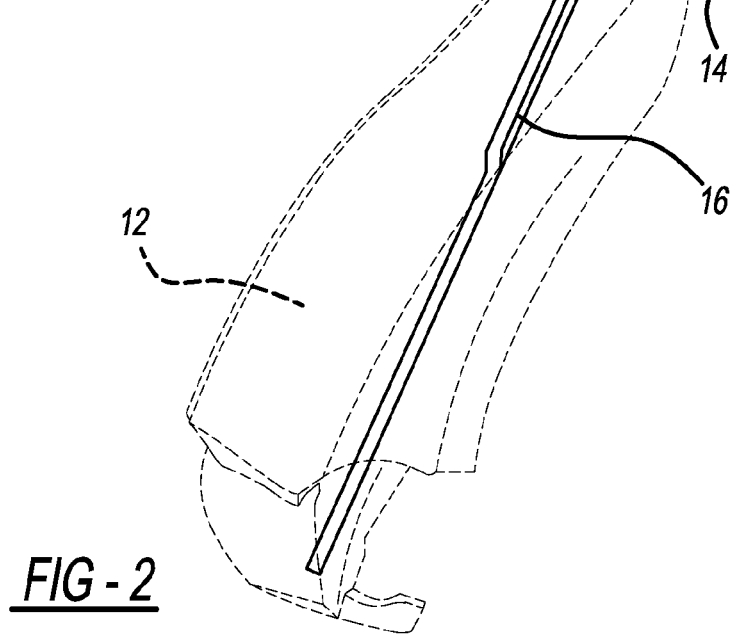
FIG. 2 illustrates a view similar to that of FIG. 1 but showing the head restraint in its upright position.

FIGS. 1 and 2 illustrate a side view of a seat assembly for a vehicle, generally illustrated as 10. The seat assembly 10 includes a seat back 12 (illustrated in broken lines) and a head restraint assembly 14. The seat back 12 may be part of a seat structure for either a front seat, a rear seat, or a third row seat in the event that the vehicle has such a seat.

The head restraint assembly 14 includes a seat back frame 16 and an associated head restraint 18. It is to be understood that the size and configuration of the seat back 12 and the components of the head restraint assembly 14 shown in the various views are only suggested and are used for illustrative purposes only. Accordingly, neither the illustrated size nor configuration of the seat back 12 and the head restraint assembly 14 are intended as being limiting.

As shown in FIG. 1, the head restraint 18 is in its retracted and lowered position. The head restraint 18 may be hidden from occupant view by either folding into the back side of the seat back 12 or resting in a pocket formed in an interior surface structure adjacent the seat back 12. Either way, an objective of the disclosed invention is to eliminate the head restraint 18 from the driver's line-of-sight when no occupant is present in the seat.

As shown in FIG. 2, the head restraint 18 is in its upright position as would be the case if the sensor associated with the seat (preferably but not absolutely in the seat base [not shown]) senses the presence of a seat occupant. In this upright position, the head restraint 18 would provide comfort and the necessary support for the occupant's head in an impact event.

Figure 3:
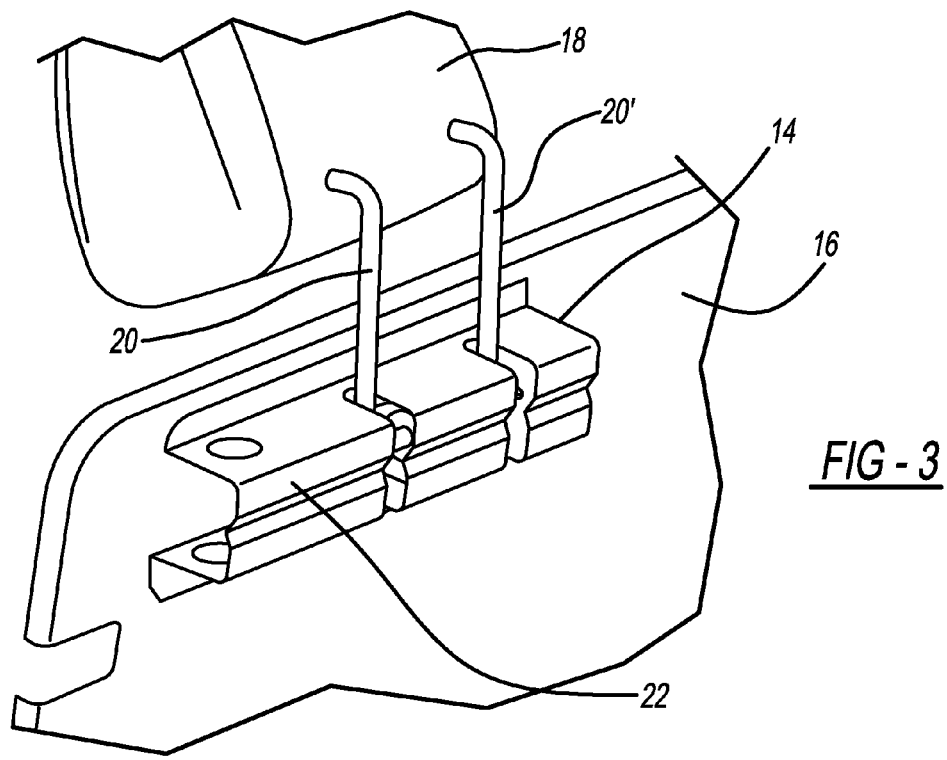
FIG. 3 illustrates a close up view illustrating the head restraint and the seat back upper beam fitted to the seat back frame.
Figure 4:
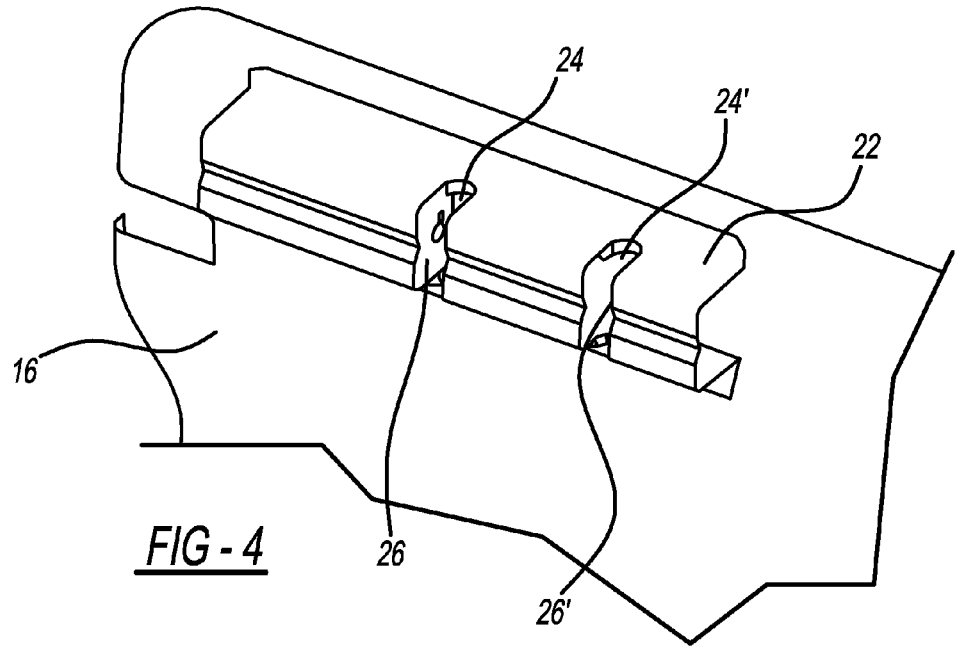
FIG. 4 illustrates a view of the seat back upper beam fitted to the seat back frame.
Figure 5:
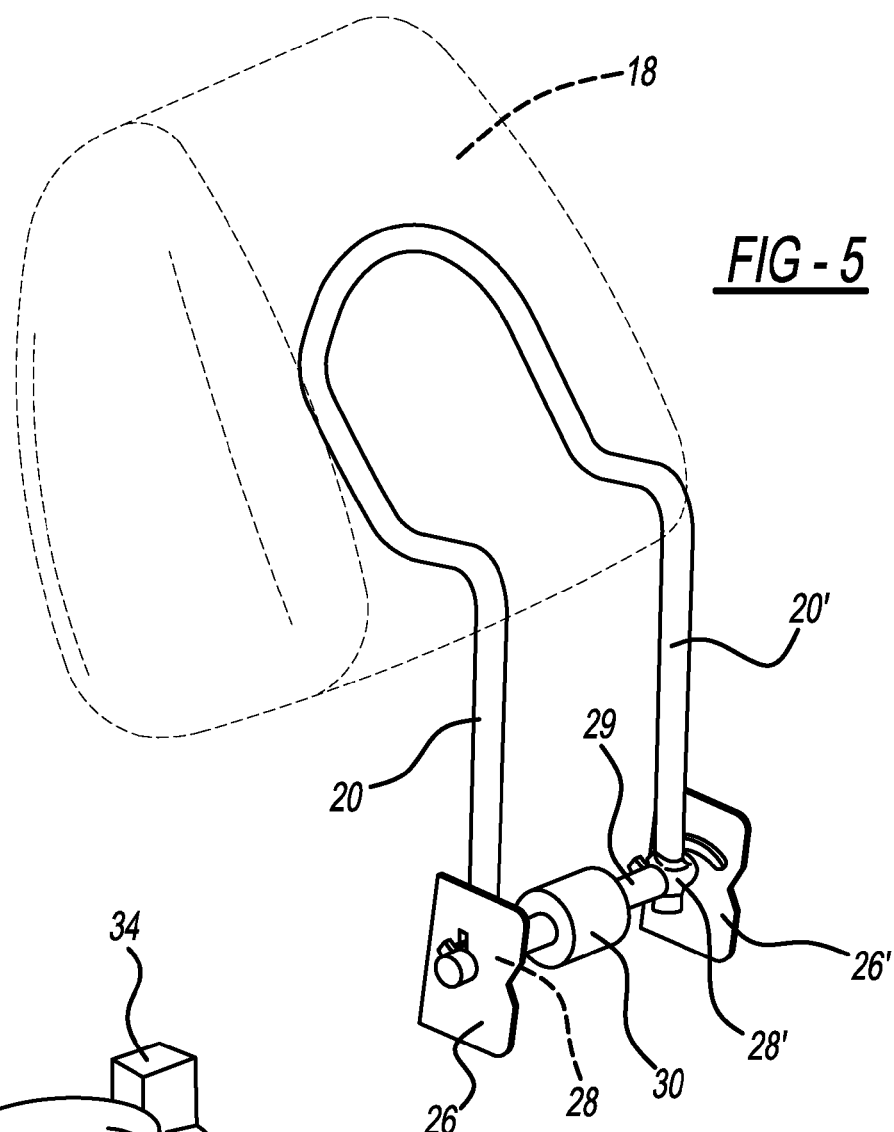
FIG. 5 illustrates a perspective view of the head restraint motion assembly in relation to the head restraint.
Figure 6:
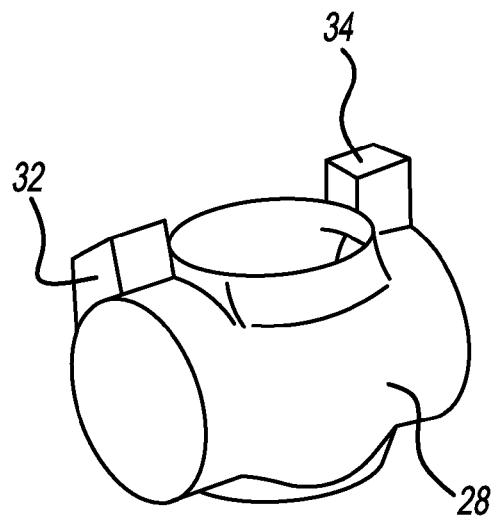
FIG. 6 illustrates a detailed view of a head restraint post bracket.
Figure 7:
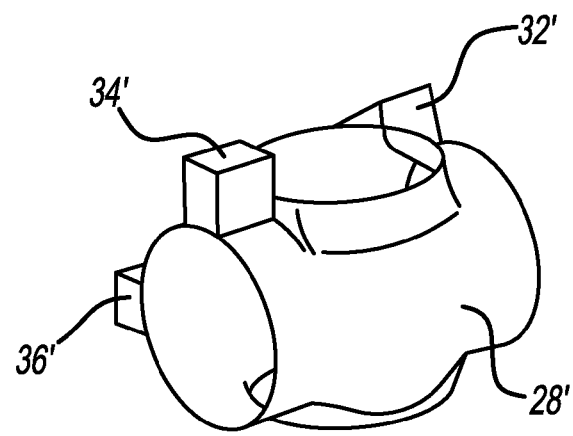
FIG. 7 illustrates a view of the head restraint post bracket of FIG. 6 taken from the opposite side.

FIGS. 3 and 4 illustrate the back side of the seat back frame 16 of the head restraint assembly 14. The head restraint 18 is supported typically by at least one head restraint post. Preferably, but not essentially, the head restraint 18 is supported by a pair of spaced apart head restraint posts 20 and 20'. As is known in the art (and as is illustrated in, for example, FIG. 5), the head restraint posts 20 and 20' represent the ends of a bent post, the curved part of which is embedded in the head restraint 18 upon molding, also as is known in the art.

The head restraint posts 20 and 20' are pivotably attached to a seat back upper beam 22 of the head restraint assembly 14. A pair of spaced apart slots 24 and 24' are formed in the seat back upper beam 22 to movably accommodate the head restraint posts 20 and 20'. Formed on the outer sides of the spaced apart slots 24 and 24' are seat beam brackets 26 and 26' of which one bracket, seat beam bracket 26, is shown in FIG. 4.

FIGS. 5 through 15 generally illustrate the operation of the head restraint assembly 14 and include such aspects of the disclosed invention as rotation control features and locking features. Fitted to the approximate ends of the posts 20 and 20' are head restraint post brackets 28 and 28' respectively. The brackets 28 and 28' interconnect a motor drive shaft 29 which is driven by a motor 30. It is to be understood that other drive arrangements may be adopted without deviating from the spirit and scope of the invention.

The head restraint post bracket 28 includes a catcher 32, a head restraint post catcher 34, and a catcher 36. The head restraint post bracket 28' includes a catcher 32', a head restraint post catcher 34', and a catcher 36'. A pair of spaced apart motor shaft cams 37 and 37' are provided on the motor drive shaft 29 as are a pair of spaced apart motor shaft catchers 38 and 38'.

The locking arrangement of the disclosed invention incorporates a pawl system which includes pawls 40 and 40' which pivot on pawl pivot pins 42 and 42' respectively. The pawl 40 is provided with a pawl pin 44 and the pawl 40' is provided with a pawl pin 44'. Slots, such as slot 39, are formed in the seat beam brackets 26 and 26' to allow movement of the pawl pins 44 and 44'. The pawls 40 and 40' are urged to their engagement positions by resilient members such as pawl springs 46 and 46'.

In operation, the motor 30 is activated by a sensor such as an electro-resistive seat sensor or a similar device (not shown) used to detect passenger presence. The sensor is typically installed between the seat cover and the seat foam. When the passenger sits in the seat, the sensor is subjected to bending which increases its voltage due to its resistance change. Other sensors may be adapted for this purpose.

If the sensor detects the presence of an occupant, the stowed head restraint 18 is rotated to its upright position. Once in this position, the head restraint 18 is locked.

Figure 10:
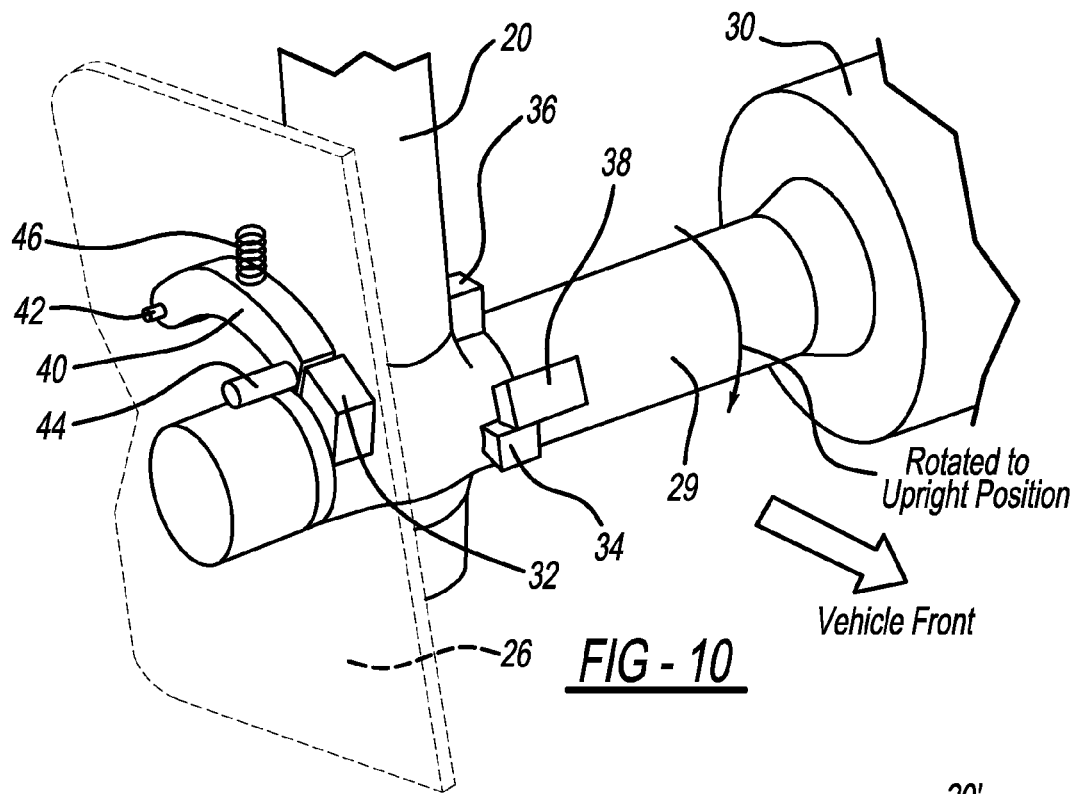
FIG. 10 illustrates a close up view of the arrangement of FIG. 8 in which the locking assembly is being engaged.

To achieve this position, the motor 30 causes the motor shaft 29 to rotate as shown in FIGS. 8 and 9. (The straight arrows in FIGS. 8 and 9 are directed to the front of the vehicle.) A reverse angle view is shown in FIG. 10 in which the vehicle front is also illustrated by a straight arrow.

Particularly, and describing the head restraint post bracket 28 and its associated components (with the understanding that the operation of the head restraint post bracket 28' and its component is identical), the motor shaft catcher 38 engages the head restraint post bracket catcher 34 to rotate to its upright position. At this time the catcher 32 on the post bracket 28 rotates under the pawl 40 and achieves the locked position by engaging the contact surface of the pawl 40. The pawl spring 46 maintains the pawl 40 in its engaged position thus holding the head restraint 18 in its upright and locked position.

Figure 11:
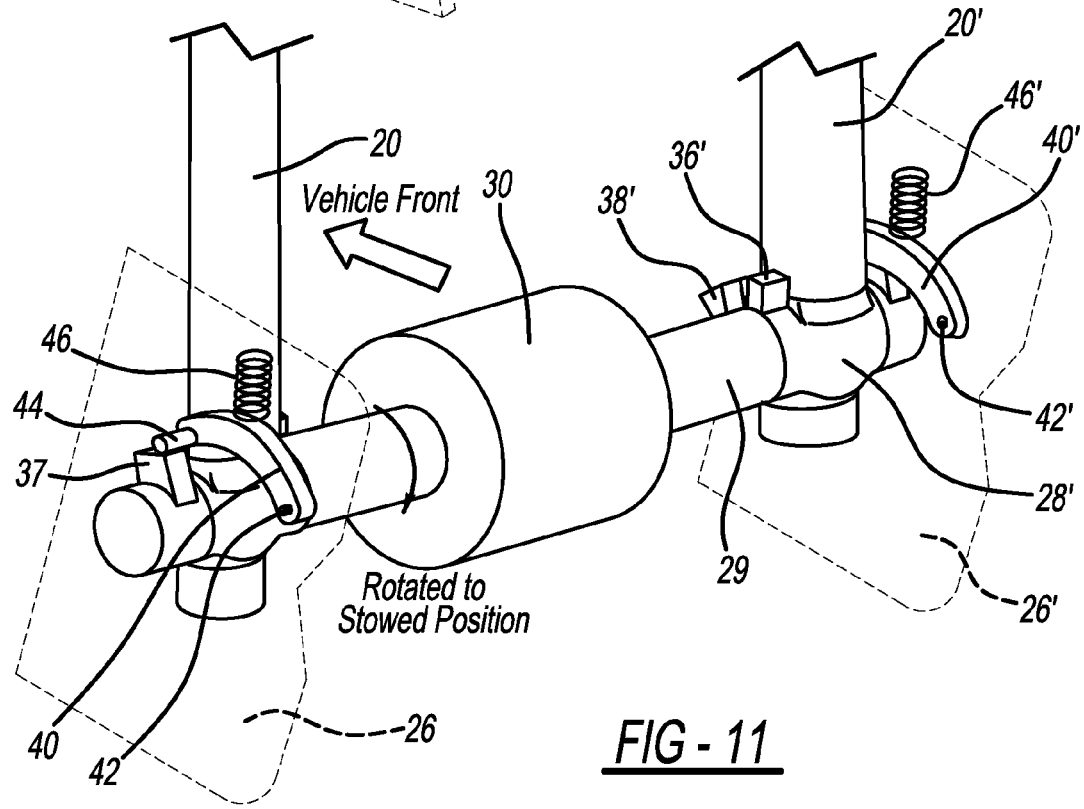
FIG. 11 illustrates a view similar to that of FIG. 10 but shows additional detail of the locking arrangement.
Figure 12:
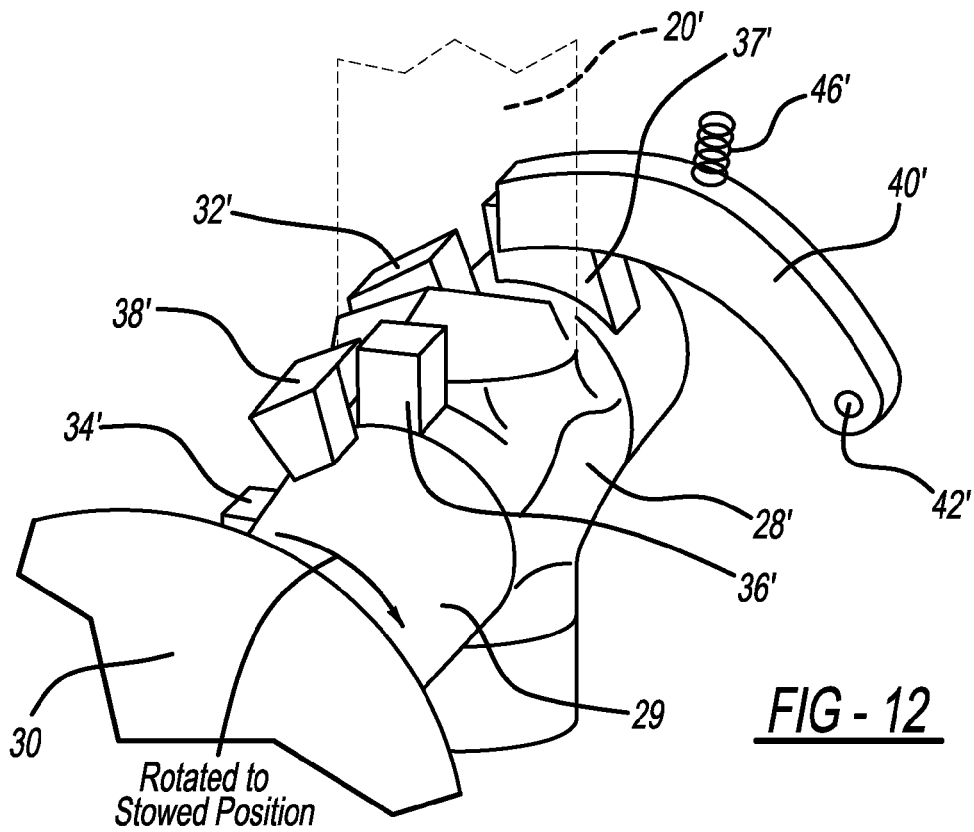
FIG. 12 illustrates a detailed view of the arrangement of FIG. 11, particularly the pawl arrangement.

In the event that the occupant sensor detects that there is no occupant present, the head restraint 18 is moved from its upright position (shown in FIG. 2) to its stowed position (shown in FIG. 1). To achieve stowage of the head restraint 18, the motor shaft 29 is rotated by the motor 30 as shown in FIGS. 11 and 12. As rotation begins, the motor shaft cam 37 engages and lifts the pawl pin 44 such that the catcher 32 can rotate under the pawl 40.

Figure 13:
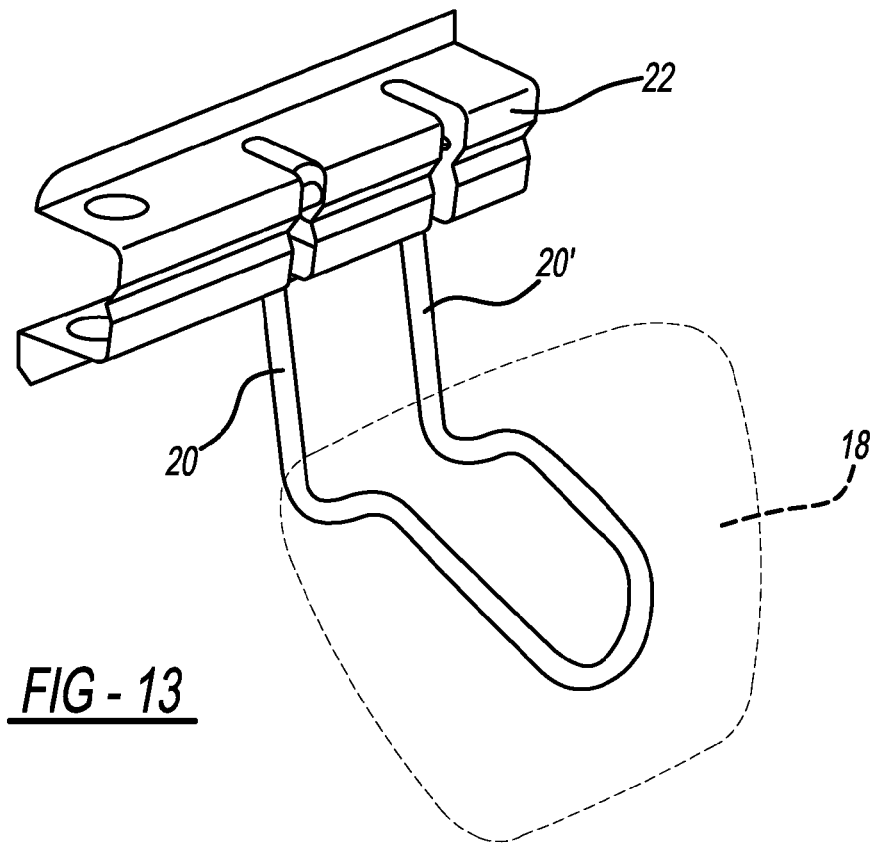
FIG. 13 illustrates a view of the head restraint in its lowered position relative to the seat back upper beam.
Figure 14:
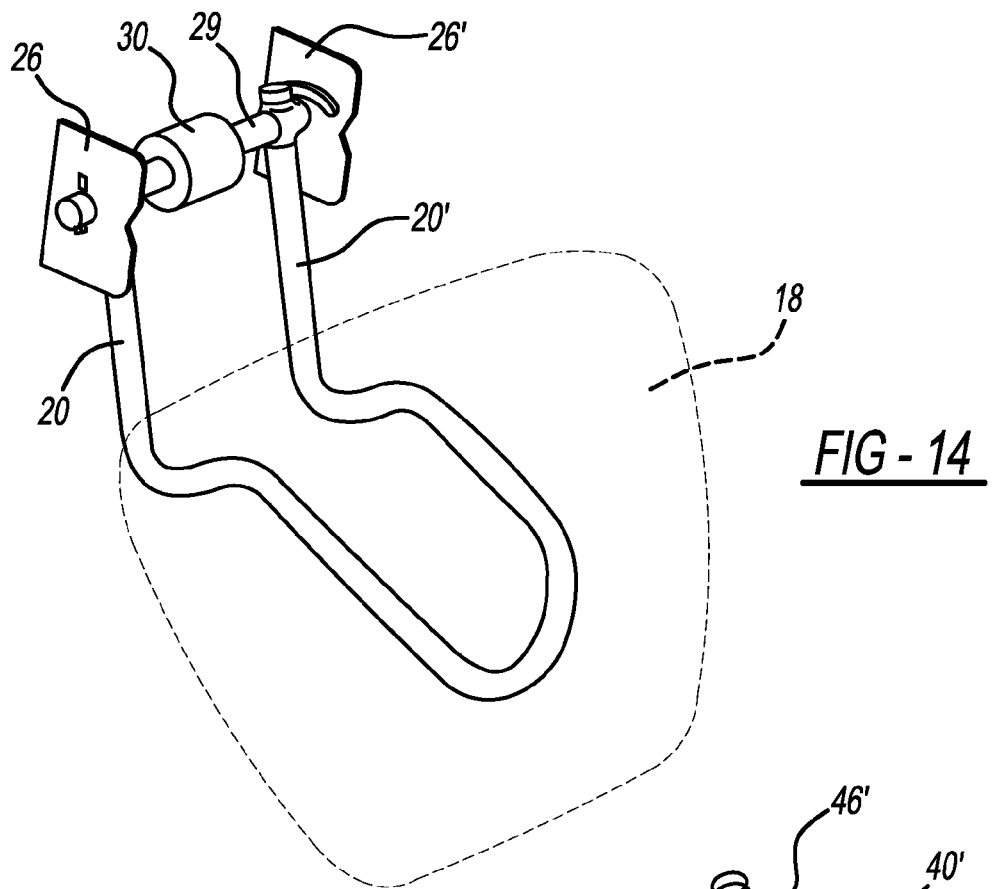
FIG. 14 illustrates a view similar to that of FIG. 13 but shows the motor, motor shaft and the seat beam brackets in relation to the lowered head restraint.
Figure 15:
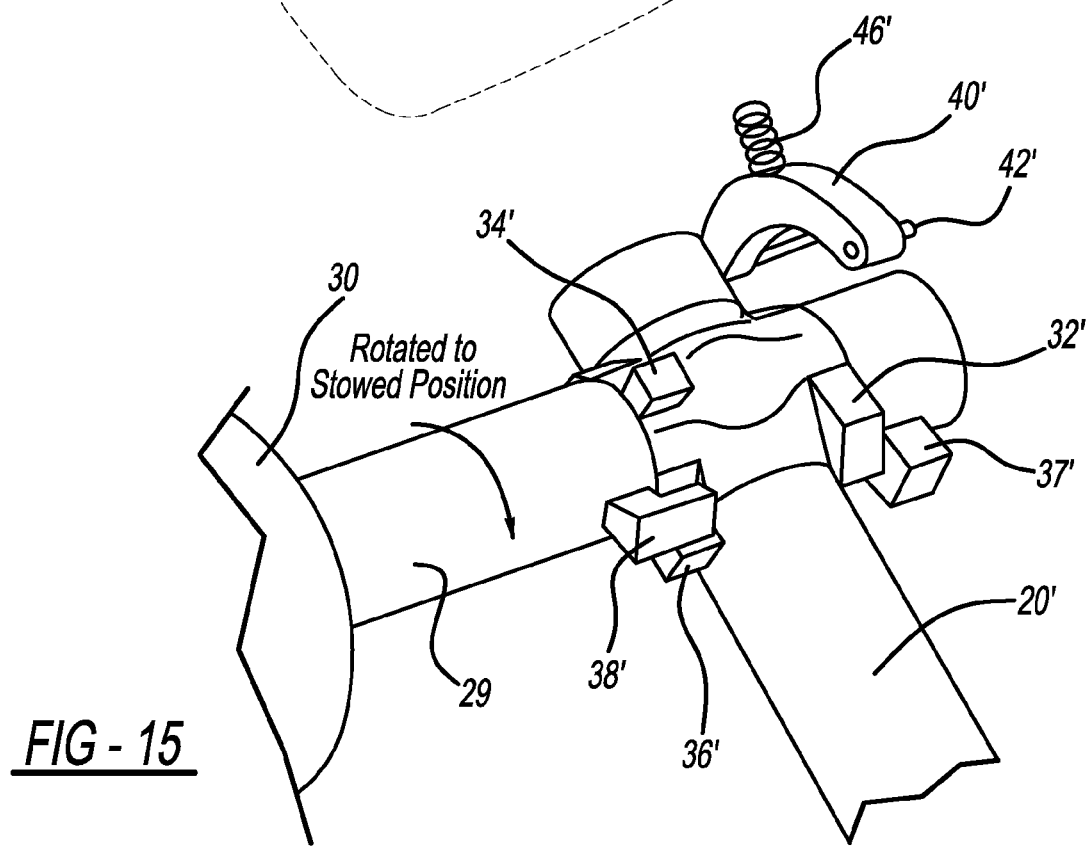
FIG. 15 illustrates a close up view of the motor shaft in relation to a head restraint post bracket and a head restraint post in its stowed position.

As the motor shaft 29 continues to rotate, the motor shaft catcher 38 engages the catcher 34 of the head restraint post bracket 28. Thus engaged, the head restraint 18 is allowed to rotate with the motor shaft 29 to its stowed position as shown in FIGS. 13 and 14. The stowed arrangement of the head restraint post bracket 28', the motor shaft 29, the head restraint post 20' and the associated locking and unlocking elements are illustrated in FIG. 15.

Figure 16:
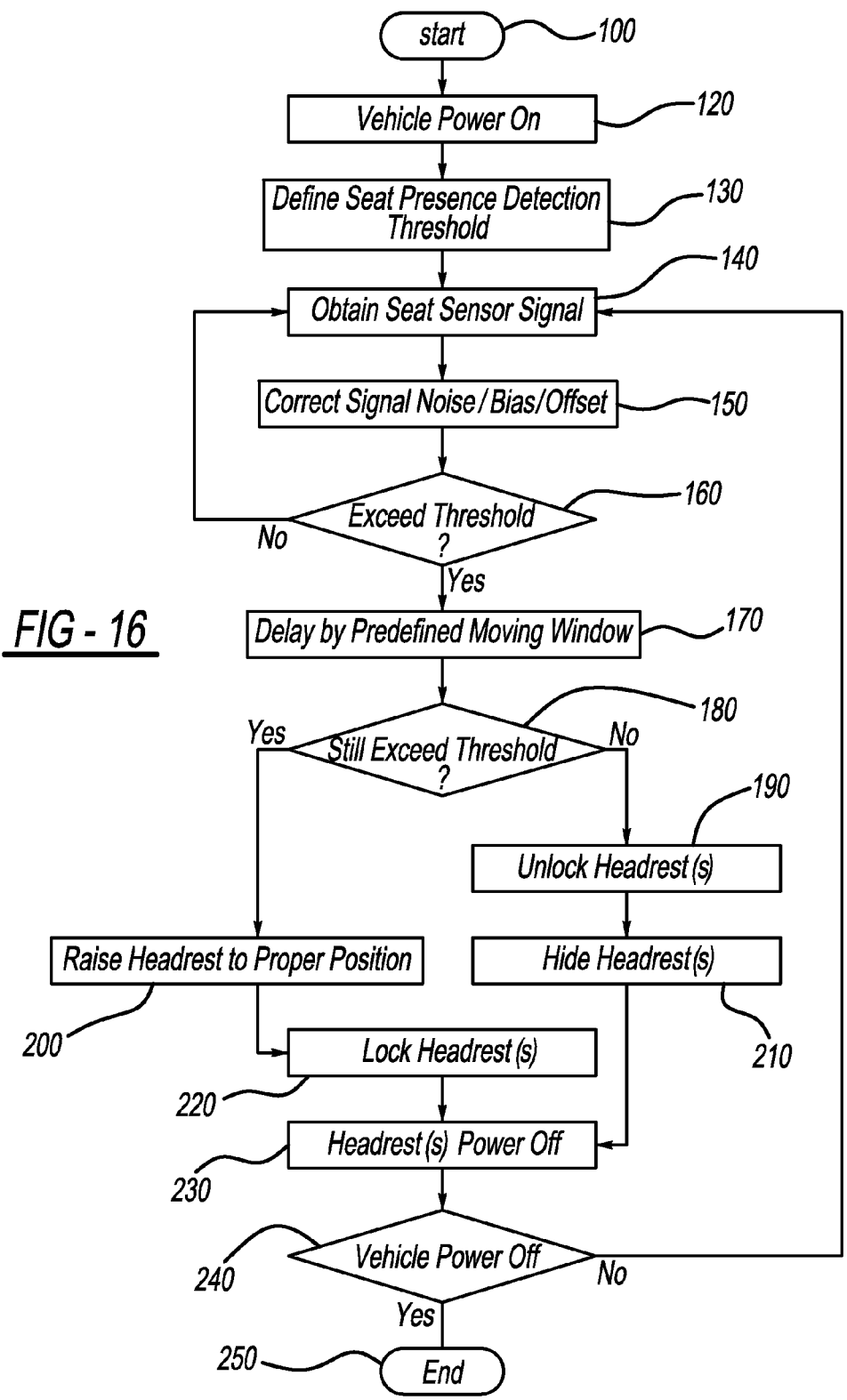
FIG. 16 is a flow chart depicting functionality of the disclosed invention.

A flow chart illustrating one embodiment of the functionality of the disclosed invention is illustrated in FIG. 16. The disclosed functionality is suggested and is not intended as being limiting.

Initially, and at the start 100, the vehicle power is turned on 120 and, subsequently, the seat presence detection threshold is defined 130. This value may be pre-determined and quantified as a part of the occupant-sensing program. The seat sensor signal is then obtained 140 and is then corrected for signal noise 150, bias and/or offset. If it is found that the value used in defining the seat presence detection threshold is not exceeded 160, then the seat sensor signal is again obtained.

However, if it is found that the value used in defining the seat presence detection threshold is exceeded, then a pre-determined waiting period is undertaken 170. After expiration of the pre-determined waiting period, if it is determined that the threshold value 180 is still exceeded, the head restraint is moved to its raised position 200 and is locked 220. If, on the other hand, after the pre-determined waiting period expires it is found that the threshold value 180 is not exceeded, the head restraint is unlocked 190 and is moved to its stowed position 210. Following movement of the head restraint to its raised position or to its stowed position (as the case may be), the headrest power is turned off 230. If the vehicle power is turned off 240 the program is at an end 250 and awaits the next cycle. However, if the vehicle power is not turned off, the seat sensor signal 140 is obtained and the sequence of determining the position of the headrest is again followed as above.

The foregoing discussion discloses and describes exemplary embodiments of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A seat assembly for a vehicle comprising:
   a seat base;
   a seat back including a beam;
   a head restraint rotatably attached to said beam and movable between a stowed, and substantially hidden position and an upright position, said restraint including a post and a post bracket attached thereto, said beam including a beam bracket to which said post bracket is rotatably attached;
   a head restraint motion assembly connecting said seat back and said head restraint.

2. The seat assembly for a vehicle according to claim 1 further including a lock for locking said head restraint in said upright position.

3. The seat assembly for a vehicle according to claim 1 wherein said head restraint includes at least one head restraint post and a head restraint post bracket attached to said at least one head restraint post.

4. The seat assembly for a vehicle according to claim 3 wherein said head restraint motion assembly includes a driver attached to said head restraint post.

5. The seat assembly for a vehicle according to claim 4 wherein said driver is a motor.

6. The seat assembly for a vehicle according to claim 5 wherein said head restraint motion assembly includes at least one on-off switch attached to said motor.

7. The seat assembly for a vehicle according to claim 1 further including a catcher attached to said head restraint post bracket and a pawl attached to said seat back beam bracket, said catcher and said pawl being operatively associated.

8. A seat assembly for a vehicle comprising:
   a seat base;
   a seat back having an upper beam including a beam bracket;
   a head restraint selectively and rotatably movable between a stowed and substantially hidden position and an upright position, said head restraint including a head restraint post, said post including a post bracket;
   a catcher attached to said post bracket;
   a pawl attached to said seat back beam bracket, said catcher and said pawl being operatively associated;
   a head restraint driver operatively associating said upper beam and said head restraint post.

9. The seat assembly for a vehicle according to claim 8 further including a lock for locking said head restraint in said upright position.

10. The seat assembly for a vehicle according to claim 8 further including a driver attached to said head restraint post.

11. The seat assembly for a vehicle according to claim 10 wherein said driver is a motor.

12. The seat assembly for a vehicle according to claim 11 further including an on-off switch attached to said motor.

13. A seat assembly for a vehicle comprising:
    a seat base;
    a seat back having an upper beam, said upper beam including a bracket;
    a head restraint selectively and rotatably movable between a stowed and substantially hidden position and an upright position depending upon occupant presence, said head restraint including a head restraint post, said post including a head restraint post bracket;
    a head restraint driver operatively associating said upper beam and said head restraint post; a catcher attached to said post bracket;
    a pawl attached to said beam bracket, said catcher and said pawl being operatively associated; and
    a sensor operatively associated with at least one of said seat base and said seat back for sensing if an occupant is present.

14. The seat assembly for a vehicle according to claim 13 further including a lock for locking said head restraint in said upright position.

15. The seat assembly for a vehicle according to claim 13 further including a motor attached to said head restraint post and an on-off switch attached to said motor.

* * * * *